United States Patent Office 2,776,423
Patented Jan. 1, 1957

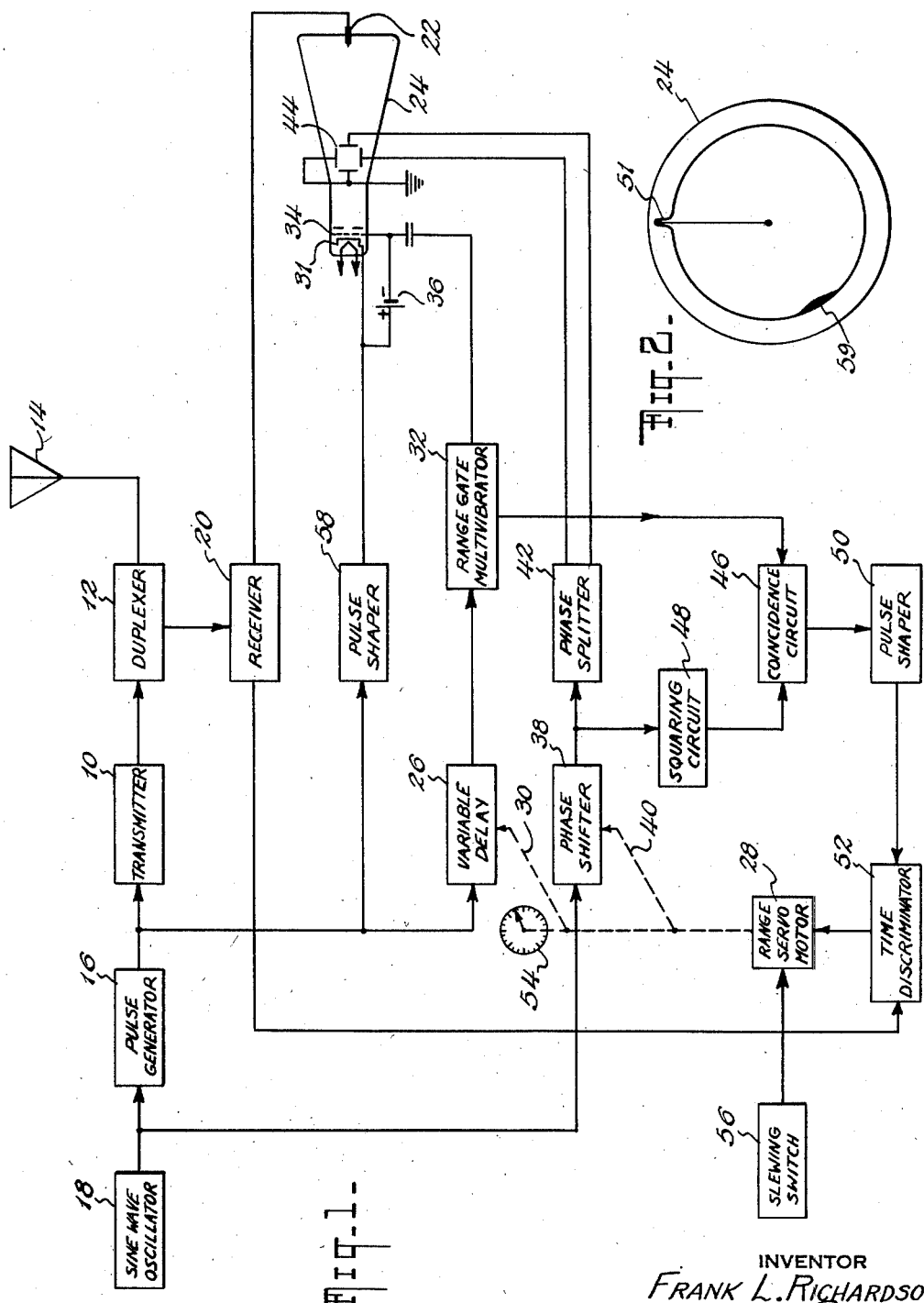

2,776,423

MOVING RANGE INDICATOR FOR AUTOMATIC TRACKING RADAR

Frank L. Richardson, Carle Place, N. Y., assignor to Sperry Rand Corporation, a corporation of Delaware Application December 3, 1954, Serial No. 472,996

4 Claims. (Cl. 343—7.3)

This invention relates to automatic tracking radar receivers, and more particularly, is concerned with a modified J-scope which indicates when the receiver is locked on a target and simultaneously indicates whether the target is moving away or toward the receiver.

Automatic tracking radar systems are well known in the art in which a received echo pulse is maintained in coincidence with the center of a target tracking gate by servo means which is actuated in response to any time displacement error between the received echo pulse and the center of the tracking gate. Mechanical dial means driven by the servo continuously indicates the range of the target as the target tracking gate is varied to maintain coincidence with the received echo pulses from the target.

It is the general object of this invention to provide means for simultaneously indicating when the center of the tracking gate is coincident with the received echo pulses and indicating whether the target is moving or stationary.

Another object of this invention is the provision of a modified J-scope in which only the portion of the range covered by the target tracking gate is shown, the echo pulse from the target when coincident with the center of the tracking gate producing a fixed indication on the J-scope.

Another object of this invention is to provide on the J-scope a reference indication which moves relative to the fixed target indication, for showing the relative movement between the target and the position of the radar receiver.

These and other objects of the invention which will become apparent as the description proceeds are achieved by apparatus comprising means for transmitting and receiving pulses of microwave frequency energy. Means is provided for generating a gating pulse at a variable time interval following a transmitted pulse. Servo-operated means adjusts this time interval to bring the received pulses into time coincidence with the center of the gating pulse. The electron beam of a J-scope is unblanked by the gating pulse and deflected by the received echo pulse. The phase of a circular sweep is adjusted simultaneously with the varying of the interval between the transmitted pulses and gating pulses in such manner that the sweep of the unblanked beam appears fixed on the scope, so that the target produced by the deflection of the beam by the echo pulse is stationary at a predetermined position on the scope when the echo pulse and center of the gating pulse are in time coincidence. An unblanking pulse is applied to the scope in coincidence with the transmitted pulse, producing a spot on the scope which appears to move with changes in range of the target relative to the fixed target pip.

For a better understanding of the invention reference should be had to the accompanying drawing, wherein:

Fig. 1 is a schematic block diagram of an embodiment of the present invention; and Fig. 2 is a view showing the face of the indicator tube.

In Fig. 1, the numeral 10 indicates generally a microwave frequency transmitter, the output of which is coupled through a duplexer 12 to a radiating antenna 14. The transmitter 10 is intermittently pulsed by means of a modulating pulse generator 16 synchronized by a crystal controlled sine wave oscillator 18. The oscillator 18 preferably operates at a frequency of 81.94 kc., so that one cycle corresponds to a range of 2000 yards. The repetition frequency of the generator 16 is preferably about 3800 pulses per second.

Echo pulses received from a target in space at the antenna 14 are coupled through the duplexer 12 to a receiver 20, which produces output pulses delayed in time following the transmitted pulses by an amount determined by the range of the target. These output pulses are applied to a deflection electrode 22 of a conventional J-scope, indicated generally at 24.

The output of the pulse generator 16 is coupled to a variable delay circuit 26 which includes a multivibrator or similar circuit capable of producing a pulse delayed by an amount which is continuously and linearly variable from substantially zero to about 110 microseconds, i. e., corresponding to a range of zero to approximately 18,000 yards. The delay interval is varied by means, for example, of an adjustable resistor or capacitor (not shown) that is mechanically actuated by a range servo motor 28 through a rotating shaft represented schematically by the dash-line 30.

The output pulse from the delay circuit 26 is coupled to a range gate multivibrator 28. The output from the range gate multivibrator is a rectangular wave gating pulse of width corresponding preferably to a range of 2000 yards, i. e., about 12.2 microseconds in duration. The range gate pulse is applied to the beam control grid 34 of the J-scope 24, for unblanking the electron beam for the duration of the range gate pulse. A potential source 36 is connected between the control grid 34 and cathode 38 of the J-scope 24 which normally biases off the electron beam. Thus, unless the received pulse from the receiver 20 is applied to the deflection electrode 22 during the interval of a range gate pulse from the range gate multivibrator 32, no target indication will appear on the J-scope.

A circular sweep for the beam of the J-scope is derived from the sine wave oscillator 18 through a variable phase shifter 38. The phase shifter may be of a goniometer type to provide a continuously adjustable phase shift through 360 degrees. The phase is varied by means of the range servo motor 28 through a shaft, indicated by the dash-line 40, which is ganged with the shaft 30 in such manner that the rate of change of the phase shift provided by the phase shifter 19 is always equivalent to the rate of change of the delay provided by the variable delay circuit 26. For example, if the shaft 40 is rotated to change the phase shift by 180 degrees, corresponding to a change in range of 1000 yards, the shaft 30 is rotated to change the delay of the pulse from the variable delay circuit 26 by 6.1 microseconds, also corresponding to a change of range of 1000 yards.

The output from the phase shifter 38 is coupled to a phase splitting network 42 which produces two sinusoidal output signals which are 90 degrees out of phase. These two output signals are coupled respectively to the horizontal and vertical deflection plates, indicated at 44 of the J-scope 24, for producing a circular sweep of the electron beam at the frequency of the sine wave oscillator 18. Since the time duration of the gating pulse is equal to one cycle of the sine wave oscillator 18, the beam of the J-scope 24 is unblanked for one revolution of the circular sweep, corresponding to a range of 2000 yards.

Moreover, since the variable delay circuit 26 and phase shifter 38 track together by virtue of the ganged shafts 30 and 40, the starting and stopping points of the unblanked circular sweep are fixed on the face of the scope.

To provide automatic range tracking, the range servo motor 28 is controlled in response to the time coincidence between the center of the range gate pulse 32 and the received echo pulse from the receiver 20. This is accomplished by coupling the output of the range gate multivibrator 32 to a coincidence circuit 46. The output of the phase shifter 38 in turn is coupled through a squaring circuit 48, which is a simple limiter circuit for converting the sine wave input to a square wave, to the coincidence circuit 48. Since one cycle of the square wave from the squaring circuit is coincident with the duration of the range gate pulse from the multivibrator 32, the coincidence circuit produces an output pulse only during the first half cycle of the square wave output of the squaring circuit 48, that is, during the interval of the positive half cycle of the output of the squaring circuit. By differentiating the output of the coincidence circuit 46, as by a pulse shaping circuit 50, a pulse is produced coincident with the trailing edge of the output pulse of the coincidence circuit 46, and therefore coincident with the midpoint of the range gate pulse from the multivibrator 32.

This output pulse from the pulse shaper 50 is applied together with an echo pulse from the receiver 20 to a time discriminator circuit 52, which is a circuit of a type described in Radiation Laboratory Series, volume 20, pages 314–320. The output of the time discriminator 52 is an error voltage varying in amplitude and polarity, with a null corresponding to time coincidence between the received echo pulse and the output pulse of the pulse shaper 50. This error voltage when amplified and applied to the range servo motor 28 actuates the variable delay circuit 26 to bring the output of the pulse shaper 50 into time coincidence with the received echo pulses from the receiver 20.

It will be appreciated from the description thus far that a tracking radar system is provided in which a J-scope is utilized as a null balance indicator. An echo pip 51 appearing on the face of the J-scope, when the range gate is centered on the echo pulse by the servo motor 28, is positioned at a fixed predetermined point on the screen, e. g., at the top of the screen, as shown in Fig. 2. Even though the target is moving, as long as the servo motor 28 is actuated to track on the echo pulse, the target pip 51 on the scope 24 remains fixed. A range indicator dial 54, driven by the range servo motor 28, is utilized to give the instantaneous range of the target when the target pip on the scope 24 is fixed at the top of the screen.

In order to initiate automatic tracking on a particular target, a slewing switch 56 is provided for driving the motor 28 to sweep the range gate through the target range. Once a pip appears on the J-scope 24, the operator knows that the echo pulse is within the 2000 yard range of the range gate pulse. When the pip on the scope moves to the top of the screen on the J-scope 24, the switch 56 is released and automatic tracking of the target is then established.

It has been found particularly desirable in the tracking system as thus far described to provide visual means on the J-scope 24 to indicate movement in range of the target. For example, the operator is particularly interested in knowing whether the target he is picking up is a fixed target or moving target, since fixed targets are generally known and would not be of interest.

To this end, the output of the pulse generator 16 is connected to a pulse shaping circuit 58, which differentiates and amplifies the output pulses from the generator 16 to produce very sharp high amplitude pulses which are connected to the cathode 31 of J-scope 24. The negative-going pulses when applied to the cathode 31 serve to momentarily unblank the electron beam of the J-scope 24, producing a spot 59 on the screen thereof.

By making the amplitude of the pulses sufficiently large, the energy of the unblanked beam is sufficient to partially defocus and deflect the beam on the screen, so as to produce an enlarged spot which is clearly visible inside the circular trace on the screen. This spot will appear coincident in time with the transmitted pulses. However, since the circular sweep is shifted in phase by the phase shifter 38 to make the target pip 51 appear stationary, the position of the spot on the screen produced by the pulses applied to the cathode 38 appears to move as the range of the target varies. This spot is clearly discernible from the radial pip 51 produced by the echo pulses applied to the electrode 22 of the J-scope 24. Thus the operator when he sees the pip positioned on the top of the screen, and observes whether the spot is rotating clockwise or counterclockwise, or standing still, knows that he has centered on a target which is either moving away or toward him, or which is stationary.

From the above description it will be seen that the various objects of the invention have been achieved by the provision of an automatic tracking radar receiver in which a modified J-scope exhibits only those targets existing within the range of the target range gate. The sweep of the J-scope is so synchronized with the occurrence of the tracking gate that all targets tracked, whether stationary or moving, appear at a fixed point on the circular trace of the J-scope. Moving target information as well as the relative direction of motion of the target is provided by the modified J-scope by unblanking the beam in coincidence with the transmitted pulse, whereby changes in range of the target are indicated by the relative changes in position between the unblanked spot appearing on the screen of the J-scope and the echo pulse pip appearing on the J-scope.

Since many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

What is claimed is:

1. In a tracking radar system, means for transmitting and receiving pulses of microwave energy, means for generating a gating pulse an interval of time after each of said transmitted pulses, the gating pulses having a time duration that is a fraction of the time between said pulses, means for varying said interval of time between the transmitted pulses and the gating pulses, servo means responsive to the time displacement between the gating pulses and the received pulses for actuating said time interval varying means to bring the received pulses and gating pulses into time coincidence, cathode ray indicating means including beam deflection electrodes and beam intensity electrodes, means coupled to one of said intensity electrodes and responsive to said gating pulse generating means for biasing on the cathode ray beam for the duration of a gating pulse, means coupled to the other of said intensity electrodes and responsive to said transmitting means for biasing on the cathode ray beam in response to a transmitted pulse, sweep generating means connected to the deflection electrodes, means for synchronizing said sweep generating means with the pulsing of said transmitting means, said sweep generating means having a repetition period substantially equal to the time duration of said gating pulses, means responsive to said servo means for shifting the phase of the sweep generating means simultaneously with the shifting of the gating pulses in response to the received pulses, and means for deflecting the cathode ray beam momentarily in response to a received pulse.

2. In a tracking radar system means for transmitting and receiving pulses of microwave energy, means for generating a gating pulse an interval of time after each of said transmitted pulses, means for varying said interval of time between the transmitted pulses and the gating pulses, servo means responsive to the time displacement between the gating pulses and the received pulses for actuating said time interval varying means to bring the received pulses and gating pulses into time coincidence, cathode ray indicating means including beam deflection electrodes and beam intensity electrodes, means coupled to one of said intensity electrodes and responsive to said transmitting means for biasing on the cathode ray beam in response to a transmitted pulse, sweep generating means connected to the deflection electrodes, means for synchronizing said sweep generating means with the pulsing of said transmitting means, means responsive to said servo means for shifting the phase of the sweep generating means simultaneously with the shifting of the gating pulses in response to the received pulses, and means for deflecting the cathode ray beam momentarily in response to a received pulse.

3. In a tracking radar system, means for transmitting and receiving pulses of microwave energy, cathode ray indicating means including beam deflection electrodes and beam intensity electrodes, means coupled to one of said intensity electrodes and responsive to said transmitting means for momentarily changing the intensity of the cathode ray beam in response to a transmitted pulse, sweep generating means connected to the deflection electrodes, means for synchronizing said sweep generating means with the pulsing of said transmitting means, means for shifting the phase of the sweep generating means in response to changes in the time interval between the transmitted and received pulses, and means for deflecting the cathode ray beam momentarily in response to a received pulse.

4. Radar apparatus comprising means for transmitting and receiving electromagnetic energy pulses, cathode ray indicating means including beam deflecting means and beam intensity varying means, the received pulses being coupled to said deflecting means, sweep generating means coupled to said beam deflecting means, said sweep generating means being synchronized with the transmitted pulses, means for shifting the phase of the sweep generating means relative to the transmitted pulses, servo means responsive to the time interval between the transmitted and received pulses for actuating said phase shifting means, and pulse generating means synchronous with the transmitted pulse coupled to said intensity varying means for producing a spot on the cathode ray indicating means with each transmitted pulse.

No references cited.